(12) United States Patent
Lisec

(10) Patent No.: US 6,192,711 B1
(45) Date of Patent: Feb. 27, 2001

(54) DEVICE FOR TRANSPORT AND COOLING OF GLASS PANES

(76) Inventor: Peter Lisec, Bahnhofstr. 34, A-3363 Amstetten-Hausmening (AT)

(*) Notice: Subject to any disclaimer, the term of this patent is extended or adjusted under 35 U.S.C. 154(b) by 0 days.

(21) Appl. No.: 09/256,769

(22) Filed: Feb. 24, 1999

(30) Foreign Application Priority Data

Feb. 24, 1998 (AT) ........................................... 326/98

(51) Int. Cl.⁷ .................................................. C03B 35/24
(52) U.S. Cl. .............................. 65/182.2; 65/25.2; 65/95; 65/348
(58) Field of Search ................... 65/25.1, 25.2, 65/25.3, 95, 114, 119, 182.2, 348

(56) References Cited

U.S. PATENT DOCUMENTS

| | | | |
|---|---|---|---|
| 3,607,198 | * 9/1971 | Meunier et al. | 65/182.2 |
| 3,615,315 | * 10/1971 | Michalik et al. | 65/25.2 |
| 3,665,730 | * 5/1972 | Linzer | 65/182.2 |
| 3,687,648 | * 8/1972 | Oulton | 65/25.3 |
| 3,756,797 | * 9/1973 | Akeyoshi et al. | 65/25.3 |
| 4,046,543 | * 9/1977 | Shields | 65/25.2 |
| 5,281,249 | * 1/1994 | Hampton et al. | 65/25.1 |
| 5,669,954 | * 9/1997 | Kormanyos | 65/273 |

* cited by examiner

Primary Examiner—Sean Vincent
(74) Attorney, Agent, or Firm—Young & Thompson

(57) ABSTRACT

A device for transporting and cooling hot glass panes (10) has a support wall (1) in which there are alternatingly stationary support ribs (3) and between two support ribs (3) at a time there are hollow chambers (4) with wall parts (11) which are adjustable in the direction perpendicular to the glass pane (10). In the transport of a glass pane (10) the movable wall parts (11) are aligned essentially flush with the free edges (5) of the support ribs (3). When a glass pane (10) is being transported the hollow chambers (4) are exposed to hot air such that between the glass pane (10) and the support wall (1) for the wall parts (11) pushed towards the glass pane (10) a thin gas cushion ("L") of hot air forms. When a glass pane (10) is being quenched the movable wall parts (11) are moved back to a greater distance from the glass pane (10). For quenching of a glass pane (10) cold air is blown out of the support ribs (3) in the wall parts (11) which are moved back relative to the glass pane (10). During quenching, the cold air from a wall-like hollow means (2) opposite the support wall (1) is blown onto the second side of the glass pane 10.

20 Claims, 4 Drawing Sheets

DEVICE FOR TRANSPORT AND COOLING OF GLASS PANES

Figure 1:
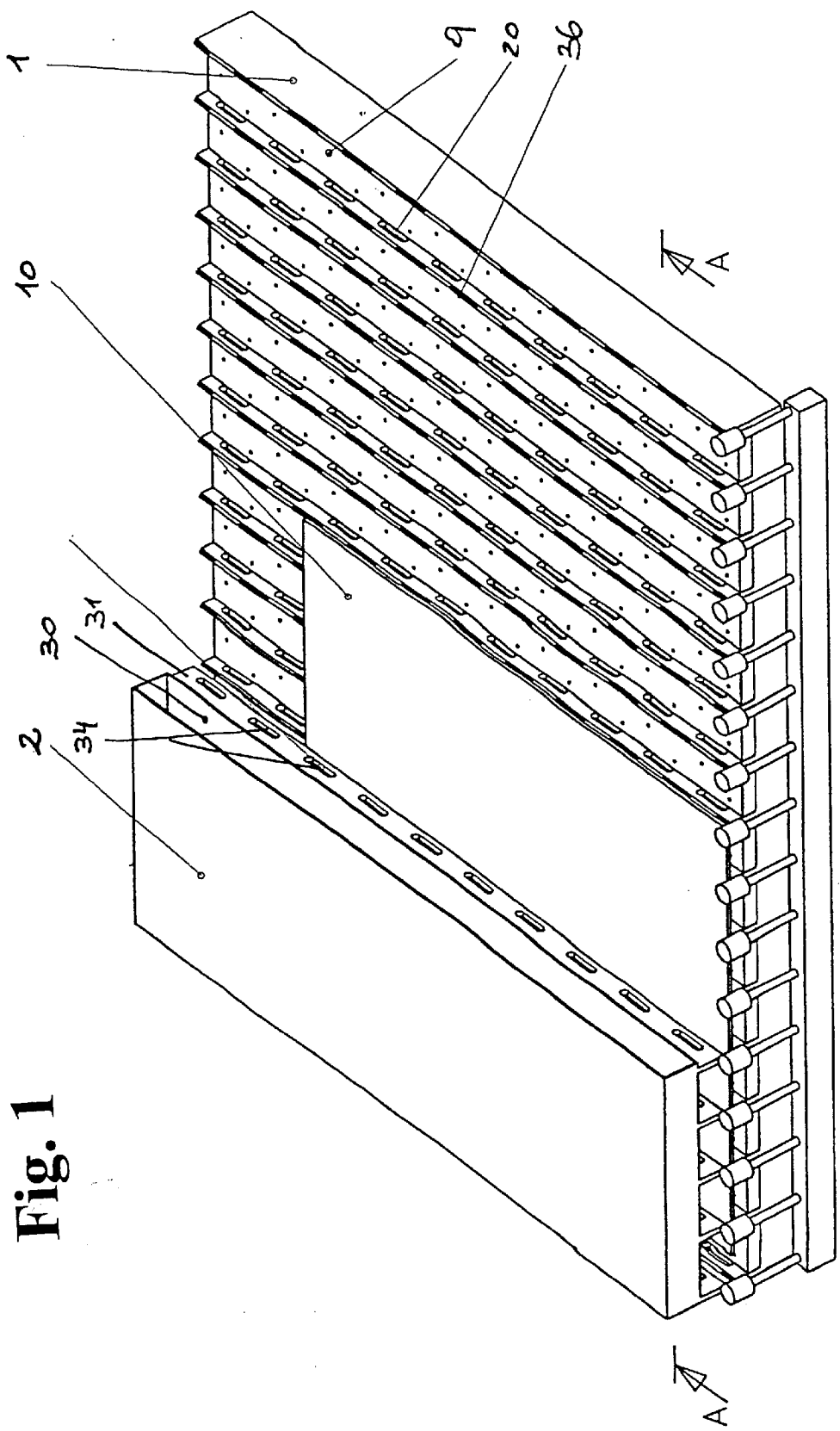

The invention relates to a device with which hot glass panes, for example glass panes which have been heated for tempering to a temperature above the tempering point, can be cooled quickly to below the critical temperature, and the device is also to be suited for transport of glass panes not aligned to be standing vertically into and out of the device.

One problem in the known devices which are equipped with air cushion transport devices (air cushion walls) is that for rapid cooling (quenching) of glass panes a comparatively thick air cushion is needed, but that a thick air cushion is disadvantageous when a hot glass pane is being transported. At a short distance between the air cushion wall and the glass pane to be cooled, during quenching cold air with high pressure would be needed so that the high air throughput necessary for quenching of the glass panes associated with high flow velocities can be achieved. But this has turned out to be a problem since there is the danger that the glass pane will be pushed away from the air cushion wall by the stream of cold air from the air cushion wall.

The object of the invention is to devise a device with which hot glass panes can be easily transported and in which this device can also be used for quenching of the glass panes.

This object is achieved as claimed in the invention first of all by the device having the features of claim 1.

Preferred and advantageous embodiments of the device as claimed in the invention are the subject matter of the dependent claims.

Using the device as claimed in the invention hot glass panes which have been heated to above the critical temperature can be easily transported, even if the glass panes are not aligned to be standing vertically. This is because due to the support ribs provided in the support wall provided for the device as claimed in the invention, reliable transport of the hot glass sheets is possible when the wall parts of the support wall of the device as claimed in the invention, i.e. the wall parts located between the support ribs, have a greater distance from the plane of the glass pane in order to guarantee the thicker air cushion necessary for quenching. In this case, the device as claimed in the invention can be used such that when the glass pane is being transported hot air is blown out through the outlet openings in the wall parts of the support wall of the device as claimed in the invention, i.e. the wall parts located between the support ribs, in order to form an air cushion for transport of the hot glass pane without cooling it to below the critical point.

In one preferred embodiment of the invention it is provided that the support ribs in the support wall of the device as claimed in the invention are stationary, conversely the wall parts located between the support ribs are adjustable in one direction perpendicularly to the plane of the support wall. With this embodiment of the device as claimed in the invention during transport of a hot glass pane the thin air cushion which is advantageous for reliable transport of the glass pane can be held between the support wall and glass pane, the air cushion preferably being supplied with hot air.

Here it is advantageous if hot air is routed into the area between the glass pane and the support wall especially through the movable wall parts, therefore through openings provided therein and optionally also through the stationary support ribs which are located between the movable wall parts.

As soon as the glass pane has reached a position in which it is entirely in the device, therefore entirely in front of the (air cushion) support wall, the movable wall parts can be withdrawn between the support ribs. The feed of hot air is stopped and then cold air or gas from the support ribs and/or the movable wall parts through the outlet openings provided therein is blown onto the glass pane so that the glass pane, as is necessary for tempering, is quickly cooled (quenched). For example, the movable wall parts are moved away from the glass pane by 20 to 25 mm relative to the stationary support ribs.

It can be advantageous if the narrow edges of the support ribs which are optionally made hollow, i.e. the edges facing the glass pane, are provided with correspondingly heat-resistant plastic strips. One material suitable for this purpose is an Aramid plastic (for example, "Kevlar", trade name manufacturer: Du Pont)

Since during quenching glass panes are exposed to cold air preferably from both sides, in the device as claimed in the invention, at least on both sides of the area in which the glass pane stands during quenching, there can be means for exposing the glass pane to cold air. At least one of the two means is made here like the support wall as claimed in the invention. It is advantageous if the distance of the two means for exposing the glass pane to gas or air from one another can be changed in order to match the intermediate space to the thickness of the glass pane to be quenched.

Since for transport of a hot glass pane in one preferred embodiment a thin cushion with hot air or gas and when quenching the glass pane by exposure to cold air or gas a correspondingly thick gas cushion can be formed on both sides of the glass pane, the glass pane during quenching can remain in the transport plane so that there is no danger that the glass pane will warp.

Support of the glass pane from underneath proceeds either via conveyor rollers or via conveyor belts with slots through which the air which forms the gas cushion can emerge from the intermediate space also to underneath.

Other details and advantages of the invention follow from the description below of one preferred embodiment of the invention which is shown in the drawings.

Figure 2:
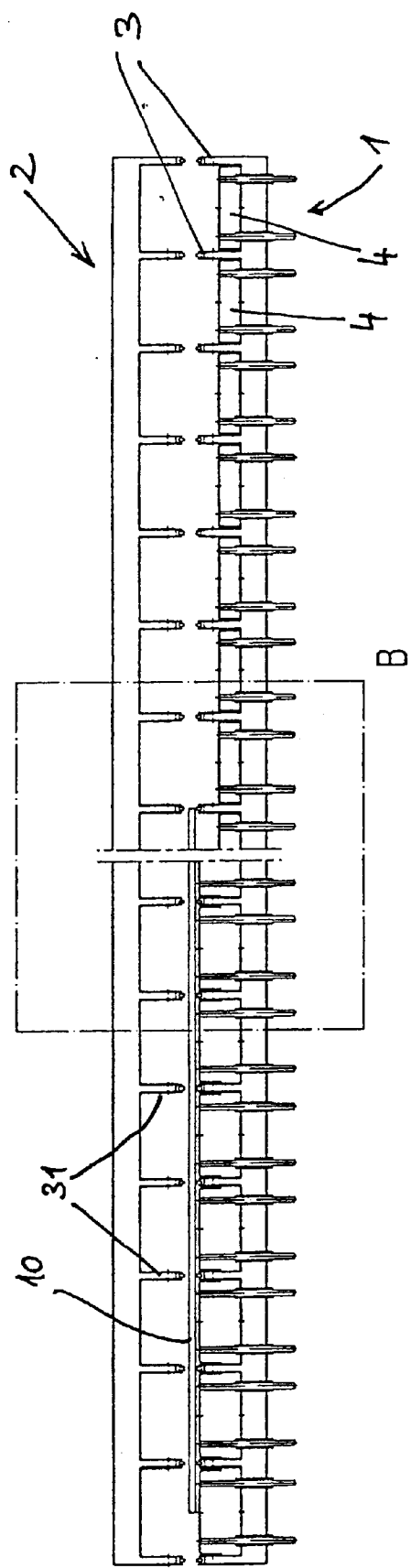

FIG. 1 schematically and partially shows a device as claimed in the invention in an oblique view (partially exposed), FIG. 2 shows a section along line A—A in FIG. 1

Figure 3:
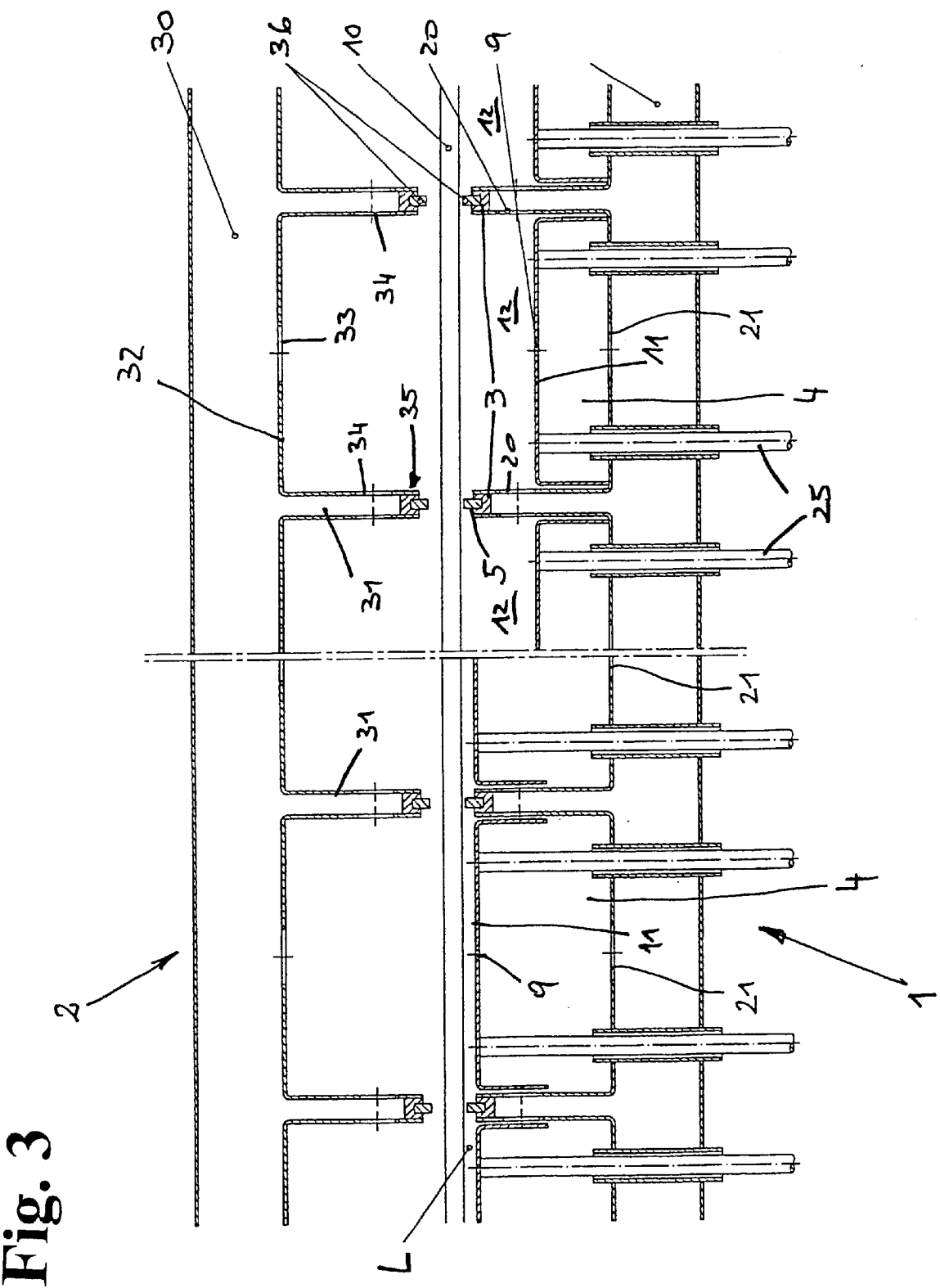
Figure 4:
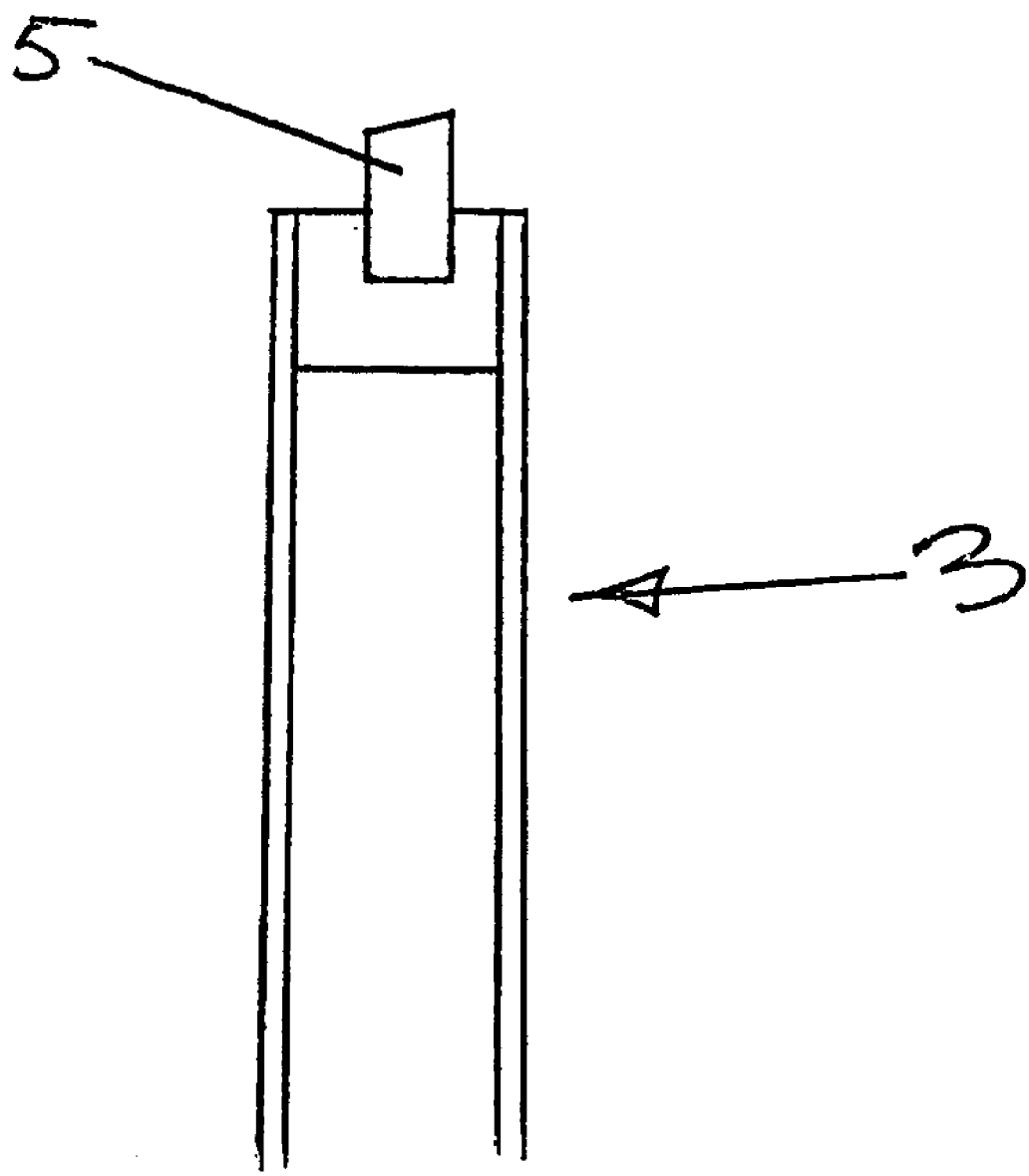

FIG. 3 shows in schematic and enlarged form one detail (detail B from FIG. 2) of the device as claimed in the invention during transport (left representation in FIG. 3) and during quenching (right representation in FIG. 3) of the glass pane, FIG. 4 shows a detail of a support rib.

In the embodiment shown by way of example, on both sides of the glass pane 10 there are means 1 and 2 for exposing it to hot and cold air. Even if on both sides of the glass pane 10 there can be means (support walls) 1 as claimed in the invention, it is preferred that only the side to which the glass pane 10 is tilted a few degrees to the vertical, as is conventional in the transport of glass panes, is made as claimed in the invention. The opposing means 2 for exposing the glass pane 10 to hot and cold air can be made as an ordinary perforated wall with a distance from the support wall 1 made as claimed in the invention which can be changed to match the thickness of the glass pane 10 to be quenched.

The means 2 can be made as shown in FIG. 2. In this example the wall-like means 2 which is assigned to the surface of a glass pane 10 pointing upward (located above it) has a hollow chamber 30 and several ribs 31 which projects towards the glass pane 10 or the support means 1. In the wall parts 32 of the hollow chamber 30 and in the side walls of the ribs 31 there are openings 33 and 34 for the exit of hot air (during transport) and of cold air (during quenching). In the free edges 35 of the ribs 31 strips 36 of heat-resistant material are inserted (for example, Kevlar, trade name).

As shown in FIGS. 2 and 3, in one preferred embodiment of the support wall 1 as claimed in the invention, between the preferably hollow support ribs 3 located stationary to the support wall 1 there are hollow chambers 4 with movable wall parts 11. The movable wall parts 11 of the hollow chambers 4 are movable in the direction perpendicular to the plane of the glass pane 10 relative to the support ribs 3 such that their distance from the conveyor plane of the glass pane 10 which is defined by the free edges (narrow sides) 5 of the support ribs 3 facing the glass pane 10 can be changed. To do this the wall parts 11 of the hollow chambers 4 are connected to rods which for their part are coupled to drives (not shown) (for example, hydraulic motors).

The support ribs 3 have narrow sides 5 which face the glass pane 10 and into which strips 6 of heat resistant material are inserted. In addition, in the narrow sides 5 of the support ribs 3 there can be holes (slots) for exit of air, especially hot air. The strips 36 of heat resistant plastic need not pass over the entire height of the narrow sides 5 of the support ribs 3, but can be interrupted, and the outlet openings for hot air can be made in the area of the interruptions. Continuous strips 36 and preferably slotted exit openings 20 provided in the side walls of the support ribs 3 for air are preferable. The outlet openings 20 are cleared when the movable wall parts 11 of the hollow chambers 4 which are located between the support ribs 3 are withdrawn (FIG. 3, right).

The support ribs 3 are mounted stationary in the machine frame and are aligned in essentially vertical planes, the narrow sides 5 of the support ribs 3 facing the glass pane 10 including with a vertical plane for example a small angle (roughly 5 to 7°) so that a glass pane 10 which is leaning over an air cushion on the support wall 1 which is formed by the support ribs 3 and the movable wall parts 11 of the hollow chambers 4 over the gas or air cushion ("L"), as is conventional for transport of glass panes 10, includes with the vertical an acute angle as illustrated in FIG. 4.

The hollow chambers 4 are exposed via openings 21 to air which emerges through openings 9 in the wall parts 11 of the hollow chambers 4.

When a hot glass pane 10 is being transported the (compare FIG. 1) support wall 1 is exposed to hot air through the hollow chambers 4 and/or the support ribs 3, so that during transport a cushion of hot air (air cushion "L") forms. If desired, by means 2 hot air can be routed onto the moving glass pane 10. The cushion "L" supplied with hot air emerging from the hollow chambers 4 otherwise prevents the glass pane 10, except in isolated cases, from coming into contact with the support ribs 3 or their plastic strips 36. Here the concern is primarily supplying hot air for forming the gas cushion "L" only via the hollow chambers 4, but not through the support ribs 3 which have been made hollow.

As soon as a glass pane 10 is located entirely opposite the support wall 1, the movable wall parts 11 of the hollow chambers 4 are withdrawn relative to the stationary support ribs 3 away from the glass pane 10 (for example roughly 20 to 25 mm). The support ribs 3 are exposed to cold air which emerges through outlet openings 20 from the support ribs 3. In this case, as shown on the right in FIG. 3, between the glass pane 10 and the support ribs 3 and the wall parts 11 of the hollow chambers 4 facing the glass pane 10 there are large chambers 12 which are supplied to cold air. At the same time the side of the glass pane 10 facing away from the support wall 1 is exposed to cold air by means 2 so that the glass pane 10 is cooled, therefore quenched, from both sides, therefore uniformly and quickly.

It is also possible to supply cold air only through support ribs 3 or only through the hollow chambers 4 or both through the support ribs 3 and also the hollow chambers 4.

In one embodiment of the wall 1 as claimed in the invention with wall parts 11 of the hollow chambers 4 located between the stationary support ribs 3, the hollow chambers have a greater distance from the conveyor plane of a glass pane 10, for example a distance 20 to 25 mm greater than the narrow sides 5 of the support ribs 3.

In summary, one preferred embodiment of the device as claimed in the invention for transport and cooling of glass panes can be described as follows:

A device for transporting and cooling hot glass panes 10 has a support wall 1 in which there are alternatingly stationary support ribs 3 and between two support ribs 3 at a time there are hollow chambers 4 with wall parts 11 which are adjustable in the direction perpendicular to the glass pane 10. In the transport of a glass pane 10 the movable wall parts 11 are aligned essentially flush with the free edges 5 of the support ribs 3. When a glass pane 10 is being transported the hollow chambers 4 are exposed to hot air such that between the glass pane 10 and the support wall 1 for the wall parts 11 pushed towards the glass pane 10 a thin gas cushion "L" of hot air forms.

When a glass pane 10 is being quenched the movable wall parts 11 are moved back to a greater distance from the glass pane 10. For quenching of a glass pane 10 cold air is blown out of the support ribs 3 in the wall parts 11 which are moved back relative to the glass pane 10. During quenching, the cold air from a wall-like hollow means 2 opposite the support wall 1 is blown onto the second side of the glass pane 10.

What is claimed is:

1. Device for transport and cooling of hot glass panes comprising:
    a support wall comprising:
        support ribs;
        wall parts disposed between adjacent said support ribs so that said support ribs extend beyond said wall parts, each said wall part including at least one outlet opening; and
        a first means for selectively routing a hot gas and a cold gas to the glass pane through the outlet openings of the wall parts; and
    an upper wall arranged above the support wall so as to provide a passage for transport of the glass panes between the upper wall and the support wall, the upper wall including a second means for selectively routing a hot gas and a cold gas to the glass pane.

2. Device as claimed in claim 1, wherein the support ribs also include said outlet openings for said hot gas and said cold gas.

3. Device as claimed in claim 1, wherein the support ribs are hollow.

4. Device as claimed in claim 3, further comprising outlet openings in side walls of the hollow support ribs, the side walls being roughly perpendicular to the glass pane.

5. Device as claimed in claim 4, wherein the outlet openings of the support ribs are in a form of longitudinal slots.

6. Device as claimed in claim 1, further comprising strips of elastic, heat-resistant material disposed on tops of the support ribs.

7. Device as claimed in claim 6, wherein the strips of elastic material are continuous over a length of the support ribs.

8. Device as claimed in claim 1, wherein the support ribs in the support wall are stationary and wherein the wall parts located between the support ribs are adjustable in a direction perpendicular to a plane of the support wall.

9. Device as claimed in claim 1, wherein the wall parts provided between the support ribs are walls of hollow chambers, said walls being positioned to face the glass pane.

10. Device as claimed in claim 9, wherein the walls of the hollow chambers facing the glass pane are the wall parts which are adjustable in a direction perpendicular to a plane of the support wall.

11. Device as claimed in claim 8, wherein when the glass pane is being transported the movable wall parts with their side facing the glass pane are aligned flush with tops of the support ribs.

12. Device as claimed in claim 8, wherein for cooling a glass pane the movable wall parts are set back relative to tops of the support ribs to a greater distance from the glass pane.

13. Device as claimed in claim 10, wherein when a glass pane is being transported the hollow chambers are supplied with hot air such that between the glass pane and the support wall a gas cushion of hot air is formed near the wall parts pushed towards the glass pane.

14. Device as claimed in claim 8 wherein to cool the glass pane the movable wall parts are set back relative to the glass pane and cold air is blown out from the support ribs.

15. Device as claimed in claim 9, wherein to cool the glass pane the movable wall parts are set back relative to the glass pane and cold air is blown out from the hollow chambers.

16. Device as claimed in claim 8, wherein the support ribs are located in vertical planes which are aligned perpendicular to a conveyor plane of the glass pane, tops of the support ribs including an acute angle with the vertical.

17. Device for facilitating transport, heating, and cooling of glass panes, comprising:

a support wall comprising:
  a support wall base;
  support ribs extending away from the support wall base, each said support rib having a top surface and sidewalls, the support ribs having outlet openings in the sidewalls, the top surfaces of the support ribs generally defining a transport plane for the glass pane;
  wall parts disposed between adjacent said support ribs, said wall parts being movable in a direction generally perpendicular to the transport plane; and
  hollow chambers disposed between adjacent said support ribs, an upper surface of each said hollow chamber being defined by a respective said wall part;
  wherein when the wall parts are in an upper position, upper surfaces of said wall parts are positioned near said top surfaces of adjacent said support ribs and the outlet openings of the adjacent support ribs are blocked, and when the wall parts are in a lower position, the outlet openings of the adjacent support ribs are opened; and
an upper wall arranged above the support wall so as to provide a passage for transport of the glass panes between the upper wall and the support wall.

18. The device of claim 17, further comprising wall part outlet openings which open to the hollow chambers.

19. The device of claim 18, further comprising means for selectively providing hot or cold gas to the outlet openings in the support ribs and the outlet openings in the wall parts.

20. The device of claim 19, wherein the upper wall comprises upper wall outlet openings and means for providing hot or cold gas to the upper wall outlet openings.

\* \* \* \* \*